US012725380B2

(12) United States Patent
Lu

(10) Patent No.: US 12,725,380 B2
(45) Date of Patent: Sep. 1, 2026

(54) IMAGE PROCESSING METHOD AND APPARATUS, ELECTRONIC DEVICE, AND STORAGE MEDIUM

(71) Applicant: Beijing Bytedance Network Technology Co., Ltd., Beijing (CN)

(72) Inventor: Zhixiong Lu, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 189 days.

(21) Appl. No.: 18/713,102

(22) PCT Filed: Nov. 21, 2022

(86) PCT No.: PCT/CN2022/133253
§ 371 (c)(1),
(2) Date: May 23, 2024

(87) PCT Pub. No.: WO2023/093679
PCT Pub. Date: Jun. 1, 2023

(65) Prior Publication Data
US 2025/0037400 A1 Jan. 30, 2025

(30) Foreign Application Priority Data
Nov. 23, 2021 (CN) ........................ 202111396951.1

(51) Int. Cl.
*G06T 19/20* (2011.01)
*G06V 20/40* (2022.01)
*G06V 40/10* (2022.01)

(52) U.S. Cl.
CPC ............. *G06T 19/20* (2013.01); *G06V 20/40* (2022.01); *G06V 40/10* (2022.01);
(Continued)

(58) Field of Classification Search
CPC ........ G06T 19/006; G06T 19/20; G06V 40/10
See application file for complete search history.

(56) References Cited

U.S. PATENT DOCUMENTS

2008/0163344 A1 7/2008 Yang
2017/0140574 A1* 5/2017 Sugita ..................... G06T 19/20
2020/0066029 A1* 2/2020 Chen ..................... G06T 15/205

FOREIGN PATENT DOCUMENTS

CN 106651498 A 5/2017
CN 109409977 A 3/2019
(Continued)

OTHER PUBLICATIONS

European Patent Office, Extended European Search Report Issued in Application No. 22897762.5, Feb. 6, 2025, Germany, 10 pages.
(Continued)

*Primary Examiner* — Charles Tseng
(74) *Attorney, Agent, or Firm* — Alleman Hall LLP

(57) ABSTRACT

Embodiments of the disclosure disclose an image processing method and apparatus, an electronic device, and a storage medium. The method includes: determining a target object in an image to be processed, and determining a three-dimensional body model corresponding to the target object; determining a wearing effect to be processed corresponding to an item to be worn, and obtaining a target to-be-displayed object wearing the item to be worn based on material information of the item to be worn, the wearing effect to be processed, and the three-dimensional body model; and updating, in response to determining that display information of the target to-be-displayed object satisfies a preset condition, the target object in the image to be processed based on the target to-be-displayed object.

20 Claims, 5 Drawing Sheets

(52) U.S. Cl.
CPC .... *G06T 2210/16* (2013.01); *G06T 2219/004* (2013.01); *G06T 2219/2016* (2013.01)

(56) References Cited

FOREIGN PATENT DOCUMENTS

| | | | |
|---|---|---|---|
| CN | 109472859 | A | 3/2019 |
| WO | 2021074630 | A1 | 4/2021 |

OTHER PUBLICATIONS

Yu, R. et al., "VTNFP: An Image-based Virtual Try-on Network with Body and Clothing Feature Presentation," Proceedings of the 2019 IEEE/CVF International Conference on Computer Vision (ICCV), Oct. 27, 2019, Seoul, South Korea, 10 pages.
Erra, U. et al., "Exploring the effectiveness of an augmented reality dressing room," Multimedia Tools and Applications, vol. 77, No. 19, Feb. 20, 2018, 10 pages.
ISA China National Intellectual Property Administration, International Search Report Issued in Application No. PCT/CN2022/133253, Jan. 28, 2023, WIPO, 4 pages.

* cited by examiner

IMAGE PROCESSING METHOD AND APPARATUS, ELECTRONIC DEVICE, AND STORAGE MEDIUM

CROSS-REFERENCE TO RELATED APPLICATION(S)

This application is a U.S. National Stage Application of PCT Application Serial No. PCT/CN2022/133253, filed Nov. 21, 2022, which claims priority to Chinese Patent Application No. 202111396951.1, filed with China National Intellectual Property Administration on Nov. 23, 2021, the disclosure of which are incorporated herein by reference in their entireties.

FIELD

Embodiments of the disclosure relate to the technical field of image processing, and for example, relate to an image processing method and apparatus, an electronic device, and a storage medium.

BACKGROUND

With the development of computer technology, rendering clothing try-on has become a development trend. At present, the adopted rendering clothing try-on mainly focuses on the simple rendering of various items to be worn, and rendering results are presented on a display interface.

According to the above method, in the specific rendering process, the impact of various factors corresponding to the items to be worn on the rendering effect, or the impact of rendering computing power factors on the rendering effect in the rendering process is not considered, and as a result, there is a large deviation between the rendering effect and the actual effect, which in turn causes poor use experience to users.

SUMMARY

The disclosure provides an image processing method and apparatus, an electronic device, and a storage medium, which can perform rendering in combination with a wearing effect and a material parameter of an item to be worn, thereby improving rendering authenticity and adaptability for a user.

In a first aspect, an embodiment of the disclosure provides an image processing method, including: determining a target object in an image to be processed, and determining a three-dimensional body model corresponding to the target object; determining a wearing effect to be processed corresponding to an item to be worn, and obtaining a target to-be-displayed object wearing the item to be worn based on material information of the item to be worn, the wearing effect to be processed, and the three-dimensional body model; and updating, in response to determining that display information of the target to-be-displayed object satisfies a preset condition, the target object in the image to be processed based on the target to-be-displayed object.

In a second aspect, an embodiment of the disclosure provides an image processing apparatus, including: a three-dimensional model determination module, configured to determine a target object in an image to be processed, and determine a three-dimensional body model corresponding to the target object; a to-be-displayed object determination module, configured to determine a wearing effect to be processed corresponding to an item to be worn, and obtain a target to-be-displayed object wearing the item to be worn based on material information of the item to be worn, the wearing effect to be processed, and the three-dimensional body model; and a target object display module, configured to update, in response to determining that display information of the target to-be-displayed object satisfies a preset condition, the target object in the image to be processed based on the target to-be-displayed object.

In a third aspect, an embodiment of the disclosure provides an electronic device. The electronic device includes: one or more processors; and a storage means, configured to store one or more programs. When the one or more programs are executed by the one or more processors, the one or more processors are caused to implement the image processing method according to any one of the embodiments of the disclosure.

In a fourth aspect, an embodiment of the disclosure further provides a storage medium including computer executable instructions. The computer executable instructions, when executed by a computer processor, execute the image processing method according to any one of the embodiments of the disclosure.

BRIEF DESCRIPTION OF THE DRAWINGS

In the accompanying drawings, same or similar reference numerals denote same or similar elements. It should be understood that the accompanying drawings are illustrative, and components and elements may not necessarily be drawn to scale.

DETAILED DESCRIPTION OF EMBODIMENTS

Figure 1:
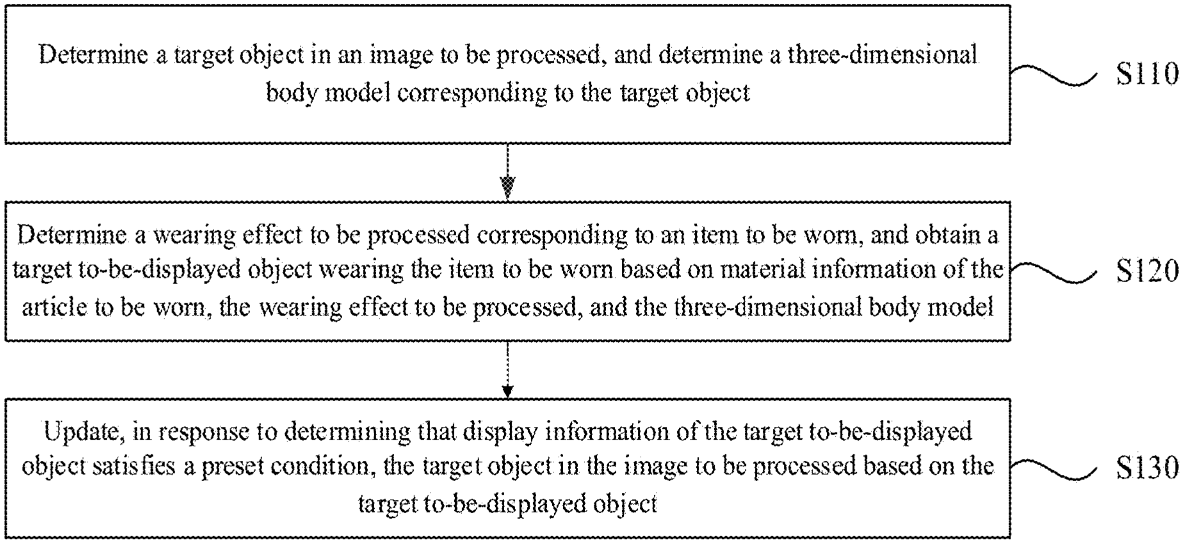
FIG. 1 is a schematic flowchart of an image processing method according to an embodiment of the disclosure.

It should be understood that the steps recorded in the method implementations in the disclosure may be performed in different orders and/or in parallel. In addition, the method implementations may include additional steps and/or omit the execution of the shown steps. The scope of the disclosure is not limited in this aspect.

The term "including" and variations thereof used in this specification are open-ended, namely "including but not limited to". The term "based on" is interpreted as "at least partially based on". The term "an embodiment" means "at least one embodiment"; the term "another embodiment" means "at least one additional embodiment"; and the term "some embodiments" means "at least some embodiments". The related definitions of other terms will be provided in the subsequent description.

It should be noted that "first", "second", and other concepts mentioned in the disclosure are only for distinguishing different apparatuses, modules, or units, and are not intended to limit the order or relation of interdependence of functions performed by these apparatuses, modules, or units. It should be noted that modifications such as "a" and "a plurality of" mentioned in the disclosure are indicative rather than limiting, and those skilled in the art should understand that unless otherwise explicitly specified in the context, it should be interpreted as "one or more".

The names of messages or information exchanged between multiple apparatuses in the implementations of the disclosure are provided for illustrative purposes only, and are not intended to limit the scope of these messages or information.

Before introducing the technical solution, application scenarios may be first exemplarily described. The technical solution of the disclosure may be applied to any scene that requires an effect presentation. For example, in live streaming scenarios, an item to be worn, namely, an effect, may be put on an anchor user. Of course, to save manpower, the anchor user may be a virtual user, and the item to be worn may be put on the virtual user. It may also be that when a user watches a live streaming, there are a plurality of items to be worn in the live streaming scenario. When the user is interested in a certain item to be worn, the item to be worn can be virtually put on the user body based on the technical solution, and a corresponding wearing effect can be seen, namely, virtual clothing try-on. It may also be that in short video shooting, the process of adding the item to be worn as an effect to the user body can be implemented by executing the technical solution. That is, the item to be worn is a rendering clothing try-on effect. The item to be worn can be determined based on a trigger operation of the user, such that a server side renders the item to be worn to achieve a corresponding rendering effect.

It should be further noted that to improve general applicability of adding the item to be worn to the user body, in the process of video shooting by the user or after video shooting is finished, the process is implemented based on the server side. For example, with each video frame shot, the video frame may be uploaded to the server side, and the server side may process the video frame. It may also be that after video shooting is finished, the entire video is uploaded to the server side. The server side may process each video frame to put the item to be worn on the user body in the video frame, and feed the finally-processed video frame back to a client for display. For example, the user may not need to see a processing effect of all video frames during clothing try-on, and may only want to see a wearing effect from a specific perspective. Meanwhile, in order to improve the processing efficiency of the server side, the user may select a specific video frame from the video frames, such that the server side renders the item to be worn to a target object. Of course, in specific applications, each video frame may also be processed based on the client, such that a corresponding processing effect is achieved. In other words, as long as computing power of the client is sufficient, the implementation may be done by the client, or the server side, or both the client and the server side.

For example, during cloud rendering clothing try-on, rendering of the item to be worn needs to be processed by combining various factors, such as a material and color of the item to be worn, and a matching degree between the item to be worn and the user. It is also necessary to consider a corresponding wearing effect when the item to be worn is put on the user body, thereby rendering a better effect. For an exemplary implementation, reference may be made to detailed descriptions of the technical solution.

It should be noted that if rendering processing is performed on the item to be worn based on the server side, the requirement for performance of a terminal device is low, and general applicability is high. For example, when processing is performed based on the server side, a real-time rendering effect is good, and rendering may be performed by combining the wearing effect and the material parameter of the item to be worn, thereby improving rendering authenticity and adaptability for the user.

FIG. 1 is a schematic flowchart of an image processing method according to an embodiment of the disclosure. This embodiment of the disclosure is applicable to any image display scenario supported by the Internet, and is used for a situation where an item to be worn is put on a target object and presented. The method can be performed by an image processing apparatus. The apparatus may be implemented in the form of software and/or hardware, and is, for example, implemented by an electronic device. The electronic device may be a mobile terminal, a personal computer (PC) terminal, a server, or the like. Any image display scenario is typically implemented through cooperation of the client and the server. The method provided by this embodiment may be executed by the server side, or executed through cooperation of the client and the server side.

As shown in FIG. 1, the method includes the following:

S110: a target object in an image to be processed is determined, and a three-dimensional body model corresponding to the target object is determined.

A user may shoot a corresponding video, and upload the video to the server side. After the server side receives the video, the item to be worn may be put on the target object of the video frame. Each video frame of the video serves as the image to be processed. The target object may be the user in the video frame. For example, if a video image of an anchor is shot in a live streaming scenario, the target object may be an anchor user. If a pet needs to be dressed and a video of the pet is shot, the target object may be the pet. The three-dimensional body model may be understood as a three-dimensional model matched with the target object. For example, the three-dimensional body model may be a three-dimensional model constructed based on the height and body type of the user in the video frame.

For example, after a target video is received, a target object in each video frame of the target video may be determined. After the target object is determined, the server side may construct the three-dimensional body model corresponding to the target object based on the height, weight, posture, and other information of the target object.

It should be further noted that before or during the uploading of the target video to the server side, the target object in the video frame may be pre-labeled.

In this embodiment, the method further includes: before determining the target object in the image to be processed, receiving at least one image to be processed sent by a client and a target video to which the at least one image to be processed belongs, thereby determining the wearing effect to be processed of the item to be worn based on the target video.

For example, the user may shoot, by the client, the target video including the target object, and meanwhile may select a specific video frame from the target video and upload the selected video frame to the server side. The selected video frame may be any video frame, and may also be a video frame where the user wants to see a wearing effect of the item to be worn. The selected video frame may be taken as an image to be processed to be uploaded to the server side. It may also be that the target video is sent to the server side, and the corresponding video frame is labeled in the target video, such that the server side only processes the labeled video frame, and the video frame only processed by the server side is taken as the image to be processed.

In this embodiment, determining the target object in the image to be processed includes: determining the target object based on label information in the image to be processed; or, taking, as the target object, an object to be processed in the image to be processed with a display scale greater than a preset display scale; or taking all objects to be processed in the image to be processed as the target objects.

For example, the user may select a target video frame from the target video, and take the target video frame as the image to be processed. The user may also label an object needing to be dressed from the image to be processed, and take the labeled object as the target object. It may also be that the server automatically determines the target object in the image to be processed. For example, a display scale of the target object in the image, namely, a preset display scale, may be preset. After the image to be processed is received, whether display scales of a plurality of target objects in the image to be processed are greater than the preset display scale may be determined, and the object with the display scale greater than the preset display scale is taken as the target object. It should be noted that if the image to be processed only includes one object, the object is taken as the target object. If the display scales of a plurality of objects each are less than the preset display scale, it is determined that the image to be processed does not include the target object; or the object with the maximum display scale is taken as the target object. It may also be that all the objects to be processed in the image to be processed are taken as the target objects.

For target object determining, the target object in the image to be processed may be automatically determined. For example, if there are a plurality of target objects in the image to be processed, corresponding items to be worn may be put on the plurality of target objects, such that the items to be worn can be put on different users at the same time, thereby improving the effect of the fun of use.

S120: a wearing effect to be processed corresponding to an item to be worn is determined, and a target to-be-displayed object wearing the item to be worn is obtained based on material information of the item to be worn, the wearing effect to be processed, and the three-dimensional body model The item to be worn may be an item that is to be put on the user. For example, the item to be worn may be various clothes, headwear, jewelry, etc. The wearing effect to be processed may refer to an effect after the item to be worn is put on the body. For example, if the item to be worn is a skirt, the wearing effect to be processed is an effect that the skirt flutters up or hangs down. The material information may be material information adopted by the item to be worn. For example, the material information may be a material of clothing, such as the percentage of wool. After the item to be worn is put on the target object, the target to-be-displayed object is obtained.

For example, in the specific processing process, the user may click a desired item to be worn from a plurality of items to be worn, and the clicked item is taken as the item to be worn. The wearing effect to be processed of the item to be worn put on the target object may be first determined. Based on the material information of the item to be worn, the wearing effect to be processed, and the three-dimensional body model corresponding to the target object, the item to be worn may be put on the three-dimensional body model, and a target display object wearing the item to be worn may be obtained.

S130: in response to determining that display information of the target to-be-displayed object satisfies a preset condition, the target object in the image to be processed is updated based on the target to-be-displayed object.

The preset condition may be whether the item to be worn is attached to the target object, or whether an existing worn item on the target object is completely covered, or the like. The display information may be pixel point information corresponding to the target object, and the pixel point information includes pixel points corresponding to the item to be worn.

For example, when complete coverage with the existing worn item is determined based on the display information of the target to-be-displayed object, it indicates that the target to-be-displayed object is displayed and updated in the image to be processed, that is, the target object in the image to be processed is updated based on the target to-be-displayed object.

According to the technical solution of this embodiment of the disclosure, the target object in the image to be processed is determined, and the three-dimensional body model corresponding to the target object is determined. Meanwhile, the to-be-worn effect corresponding to the item to be worn is determined, and then, the item to be worn is put on the target object based on the material parameter of the item to be worn, the corresponding wearing effect, and the corresponding three-dimensional body model, and the target to-be-displayed object is obtained. If the display information of the target to-be-displayed object satisfies the preset condition, the target object in the image to be processed is updated based on the target to-be-displayed object, and the target object wearing the item to be worn is obtained. The situation that in the prior art, the impact of various factors corresponding to the item to be worn on the rendering effect, or the impact of rendering computing power factors on the rendering effect in the rendering process is not considered, and as a result, there is a large deviation between the rendering effect and the actual effect, which in turn causes poor use experience to the user is avoided. Rendering can be performed in combination with the wearing effect and the material parameter of the item to be worn, thereby improving rendering authenticity and adaptability for the user.

Figure 2:
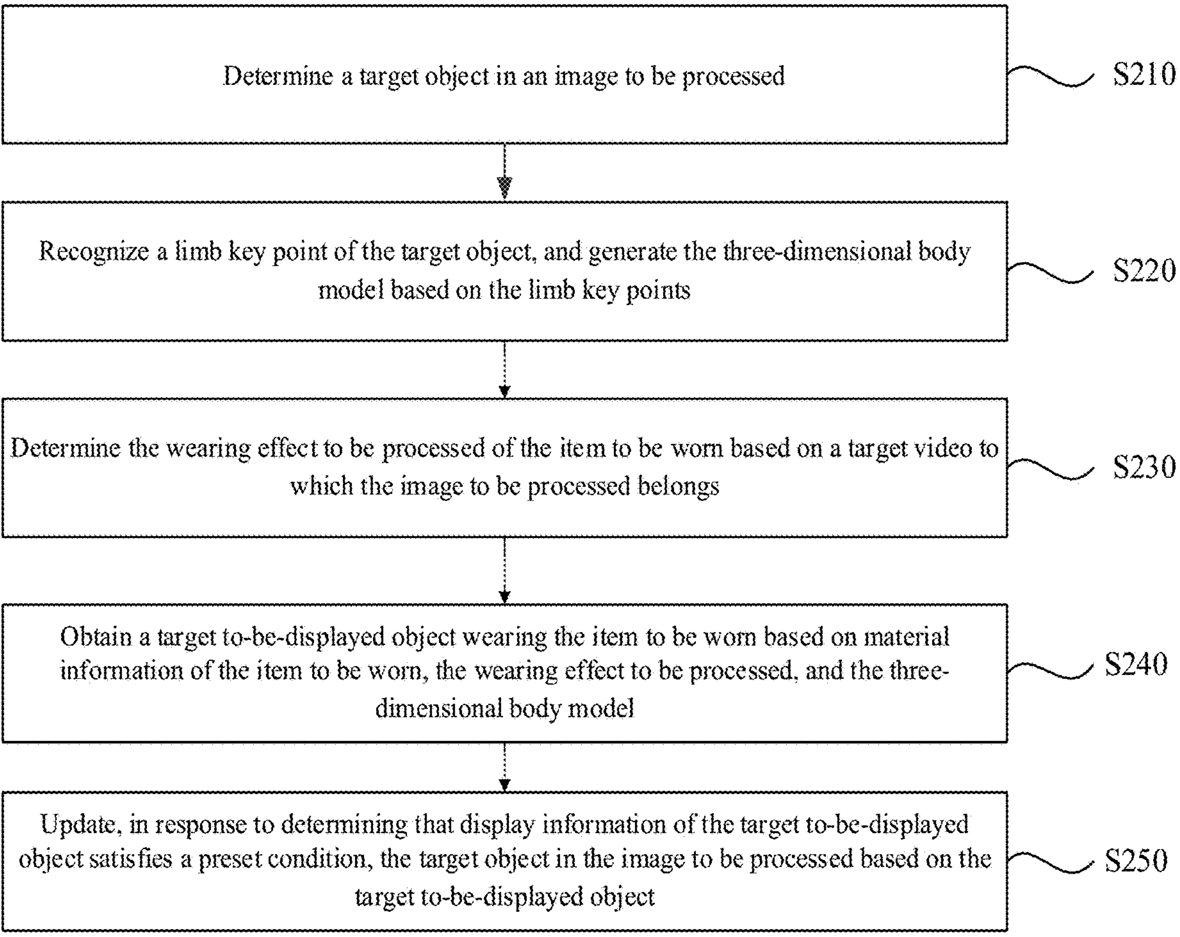
FIG. 2 is a schematic flowchart of an image processing method according to another embodiment of the disclosure.

FIG. 2 is a schematic flowchart of an image processing method according to another embodiment of the disclosure. Based on the foregoing embodiment, determining a three-dimensional body model corresponding to the target object and determining a wearing effect to be processed of the item to be worn can be described in detail, and for an exemplary implementation, reference may be made to detailed descriptions of the technical solution. Technical terms that are the same with or corresponding to those in the foregoing embodiment are not repeated herein.

As shown in FIG. 2, the method includes the following:

S210: a target object in image to be processed is determined.

For example, a user may shoot a target video including the target object in real time. Before uploading the target video to a server side, a specific video frame may be selected and upload. Or, after the target video is uploaded to the server side, the server side may intelligently select a video frame with a longer stationary duration as the image to be processed. For example, the target object in the image to be processed may be determined based on the above method.

Figure 3:
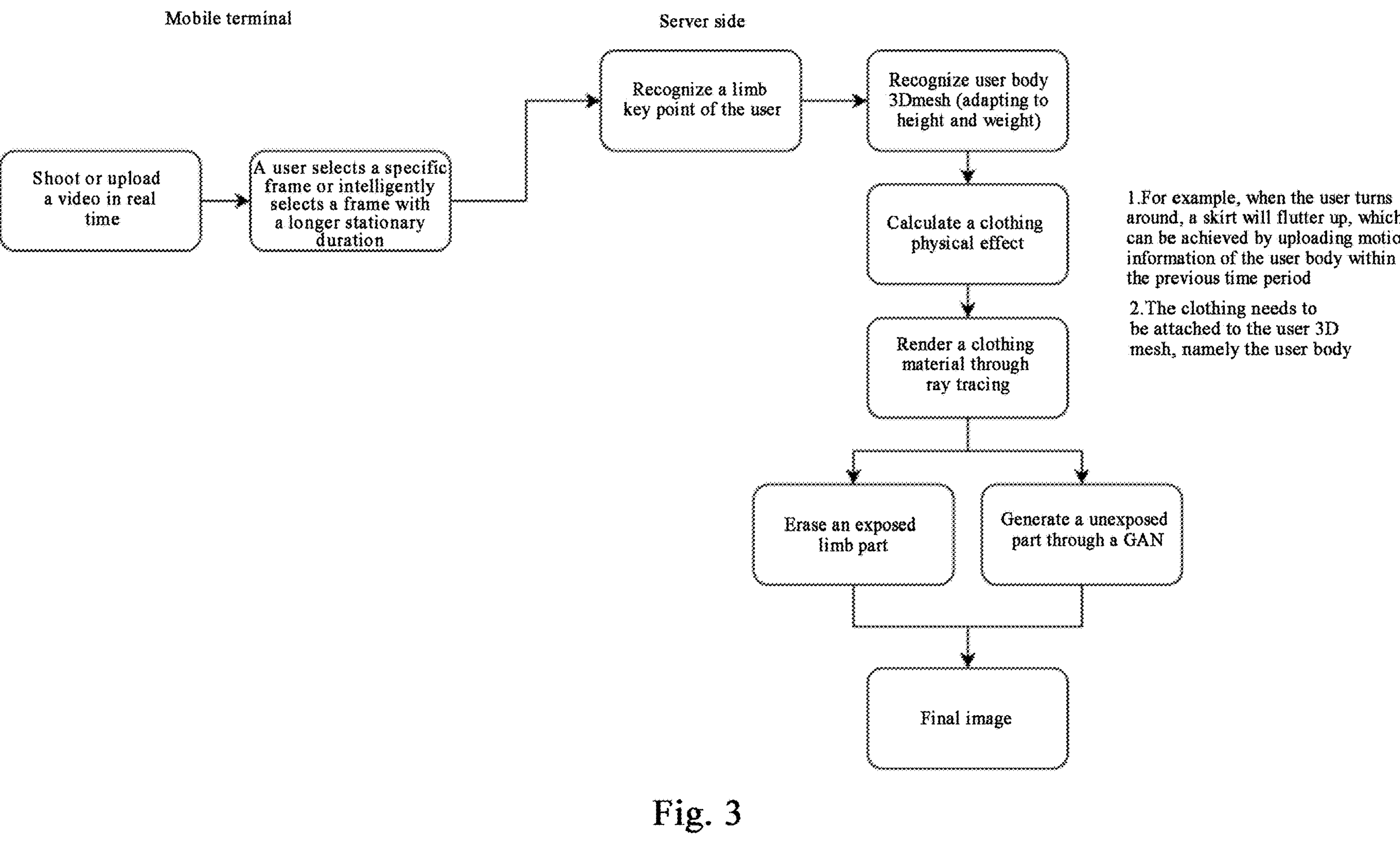
FIG. 3 is a schematic flowchart of an image processing method according to another embodiment of the disclosure.

Exemplarily, referring to FIG. 3, the user may shoot a video including a target object based on a camera device on the client. After shooting is finished, the user may select several specific video frames from the shot video as image to be processed, and send the image to be processed and the target video to the server side. Alternatively, in the shooting process, communication between a terminal device and the server side is established so as to send the shot video to the server side, and the server side may set a corresponding video frame selecting algorithm. For example, video frames of the target object at different perspectives are obtained as the image to be processed; or, a video frame with a longer stationary duration are intelligently selected as the image to be processed.

S220: a limb key point of the target object is recognized, and the three-dimensional body model is generated based on the limb key point.

The limb key point corresponding to the target object may be determined by adopting a key point recognition algorithm. The limb key point includes a key point of a shoulder, arm, hip, leg, and ankle. A human skeleton model may be constructed based on the above key point. For example, a body 3Dmesh of the target object is recognized, such that the three-dimensional body model of the target object is obtained, and in this case, the three-dimensional body model is adaptive to the height and weight of the target object.

For example, the server side receives the image to be processed, and after the target object in the image to be processed is determined, the limb key point recognition algorithm may be adopted to recognize a plurality of limb key points of the target object. Then, the 3Dmesh of the user is recognized, that is, the three-dimensional body model corresponding to the target user is constructed, which is applicable to the height and weight of the target object.

Figure 4:
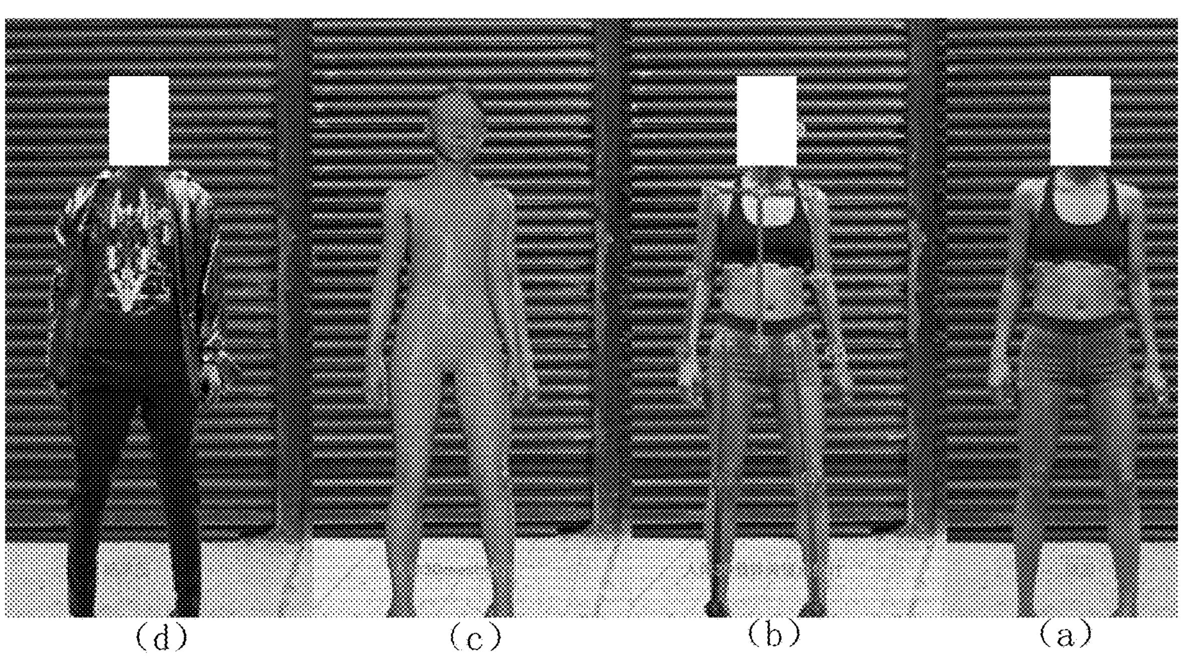
FIG. 4 is a schematic diagram of a rendering process according to an embodiment of the disclosure.

Exemplarily, referring to FIG. 4 and continuing to refer to FIG. 3, the server side may recognize the target object in the image to be processed to obtain FIG. 4(*a*). After the target object is recognized, the limb key point of the user may be recognized, that is, 3D limb key point estimation is performed to obtain the plurality of limb key points, as shown in FIG. 4(*b*). Then, the user body 3Dmesh is recognized, such that the three-dimensional body model corresponding to the target object, which is adaptive to the height and weight of the user, is obtained, as shown in FIG. 4 (c).

S230: the wearing effect to be processed of the item to be worn is determined based on a target video to which the image to be processed belongs.

The video to which the image to be processed belong is taken as the target video.

For example, after the server side receives the target video and determines the various image to be processed in the target video, the wearing effect to be processed corresponding to the item to be worn may be determined based on the target video to which the image to be processed belongs.

For example, determining the wearing effect to be processed of the item to be worn based on the target video to which the image to be processed belongs includes: determining at least two video frames in the target video that are associated with the image to be processed; and determining the wearing effect to be processed of the item to be worn based on the at least two video frames.

The at least two video frames may be two video frames or a plurality of video frames, and a specific number of the video frames is matched with a specific demand. For example, the target object in the image to be processed is in a rotating posture, and in this case, if the item to be worn is a skirt, the skirt will flutter up, and then, the wearing effect to be processed is a fluttering effect. The height and angle of fluttering need to be determined in combination with the several previous video frames. In this case, a plurality of video frames before and after the image to be processed may be obtained, and motion information of the target object is determined by adopting a kinematics algorithm. For example, the motion information includes a rotational speed and intensity, and based on this, the wearing effect to be processed corresponding to the item to be worn may be determined.

For example, the several previous and subsequent video frames of the target video to which the image to be processed belongs are obtained and calculated to determine motion parameter of the target object in the video frames. The motion parameter includes information such as a rotational speed. The wearing effect to be processed may be determined based on the above parameters.

Exemplarily, referring to FIG. 3, the server side may store a corresponding algorithm for calculating a clothing physical effect. For example, the posture of the target object in the image to be processed is the rotating posture, and in this case, the effect of the item to be worn is the effect of skirt fluttering, which may be achieved by obtaining the several previous and subsequent video frames of the video to which the image to be processed belongs and determining the body motion information of the target object based on the several video frames, thereby obtaining the skirt fluttering height and a corresponding effect. For example, the reason for determining the 3Dmesh corresponding to the target object in the technical solution is that the item to be worn can be attached to the three-dimensional body model of the target object, that is, the item to be worn is attached to the target object, and an image with a realistic wearing effect is obtained.

S240: a target to-be-displayed object wearing the item to be worn is obtained based on material information of the item to be worn, the wearing effect to be processed, and the three-dimensional body model.

In this embodiment, before rendering based on the material information of the item to be worn, the material parameter corresponding to the item to be worn may be first determined. For example, material information corresponding to the item to be worn is invoked from a store. The store pre-stores material information of various items to be worn; and or the material information corresponding to the item to be worn is determined by processing an image corresponding to the item to be worn based on a pre-trained material parameter determination model.

The material parameters corresponding to the items to be worn may be pre-determined, and a corresponding relationship between the items to be worn and the material parameters is constructed and stored, such that when the item to be worn is put on the target object, the material information corresponding to the item to be worn may be invoked from the corresponding relationship stored in the store. The material information may be raw material compositions and the like adopted by the item to be worn. The material parameter determination model is pre-trained, and an image corresponding to the item to be worn may be input to this neural network model. This neural network model may output the material parameter of the item to be worn, and the material parameter is taken as the material information. Training samples for training the material parameter determination model are images of a plurality of items to be worn, material parameters of the corresponding items to be worn are outputted, and based on the training samples, the material parameter determination model may be obtained through training.

For example, the material information corresponding to the item to be worn may be invoked from the store; or, the image corresponding to the item to be worn is inputted to the pre-trained material parameter determination model, and the material parameter determination model may obtain the material information corresponding to the item to be worn.

Due to the determination of the material information, the item to be worn closely approximating an actual item to be worn can be rendered as much as possible, thereby improving the rendering authenticity.

Exemplarily, continuing to refer to FIG. 3, the material information of the item to be worn is determined based on ray tracing, namely rendering a clothing material through ray tracing.

In this embodiment, obtaining the target to-be-displayed object wearing the item to be worn based on the material information of the item to be worn, the wearing effect to be processed, and the three-dimensional body model includes: rendering the item to be worn consistent with the wearing effect to be processed on the three-dimensional body model with the material information as a rendering parameter, thereby obtaining the target to-be-displayed object wearing the item to be worn.

For example, after the material information is determined, the item to be worn consistent with the wearing effect to be processed may be rendered on the three-dimensional body model with the material information as the rendering parameter, that is, the item to be worn is put on the target object to obtain the target to-be-displayed object, and refer to FIG. 4(*d*).

S250: in response to determining that display information of the target to-be-displayed object satisfies a preset condition, the target object in the image to be processed is updated based on the target to-be-displayed object.

In this embodiment, if the pixel point corresponding to the item to be worn covers the pixel point of an original worn item, the preset condition is satisfied, and based on the target to-be-displayed object, the target object in the image to be processed is updated.

When the target video is shot, the target object wears certain accessories. For example, the accessories may be clothing, jewelry, etc., and the wearing clothing is taken as the original worn item.

For example, whether the pixel point of the item to be worn covers the pixel point of the original worn item is determined, and based on a determination result that the pixel point of the item to be worn covers the pixel point of the original worn item, the user can only see an image after the item to be worn has been worn, and in this case, the effect is most closely matched with the effect actually needed, which indicates that the display information of the target to-be-displayed object satisfies the preset condition. In this case, the target object rendered with the item to be worn may be taken as the target to-be-displayed object, and based on the target to-be-displayed object, the target object in the image to be processed is updated.

In practical applications, there may be situations where the original worn item of the target object in the image to be processed is a down coat, the item to be worn is a skirt, and in this case, a rendering situation that the user may not only see an image wearing the item to be worn, but also see a part of the original worn item may happen, thereby affecting the user try-on effect.

To improve authenticity of the rendering result, at least one of the following two measures can be taken. According to a first implementation, in response to determining that the pixel point corresponding to the item to be worn do not cover the pixel point of the original worn item, an exposed pixel point of the original worn item is erased, thereby obtaining the target to-be-displayed object satisfying the preset condition.

It should be understood that referring to FIG. 3, the item to be worn is the skirt, the original worn item is the down coat, and in this case, after the item to be worn is put on the target object, the pixel points of the down coat uncovered with the skirt are erased to obtain the target to-be-displayed object satisfying the preset condition, that is, exposed limb parts are erased through a pixel point erasing method, namely inpainting.

According to a second implementation, in response to determining that an item type of the item to be worn is a first preset type, a limb model corresponding to the target object is determined; and based on the limb model, a plurality of limb parts in the target to-be-displayed object are adjusted, thereby updating the target object based on the adjusted limb parts.

The first preset type may be clothing that exposes arms or legs. For example, the first preset type may be a summer clothing type. If the item type of the item to be worn is the summer clothing type, the corresponding limb model may be invoked based on whether the item to be worn is tops or bottoms. The limb model may be an arm model and a leg model. The main function of the limb model is to remove the clothing on the corresponding limb of the target object, thereby obtaining the limb without the clothing. The plurality of limb parts of the target to-be-displayed object may be adjusted based on the limb model, such that the target object is updated based on the adjusted limb parts. In other words, the unexposed parts can be processed through a generative adversarial network (GAN) model (a pre-trained limb model).

Figure 5:
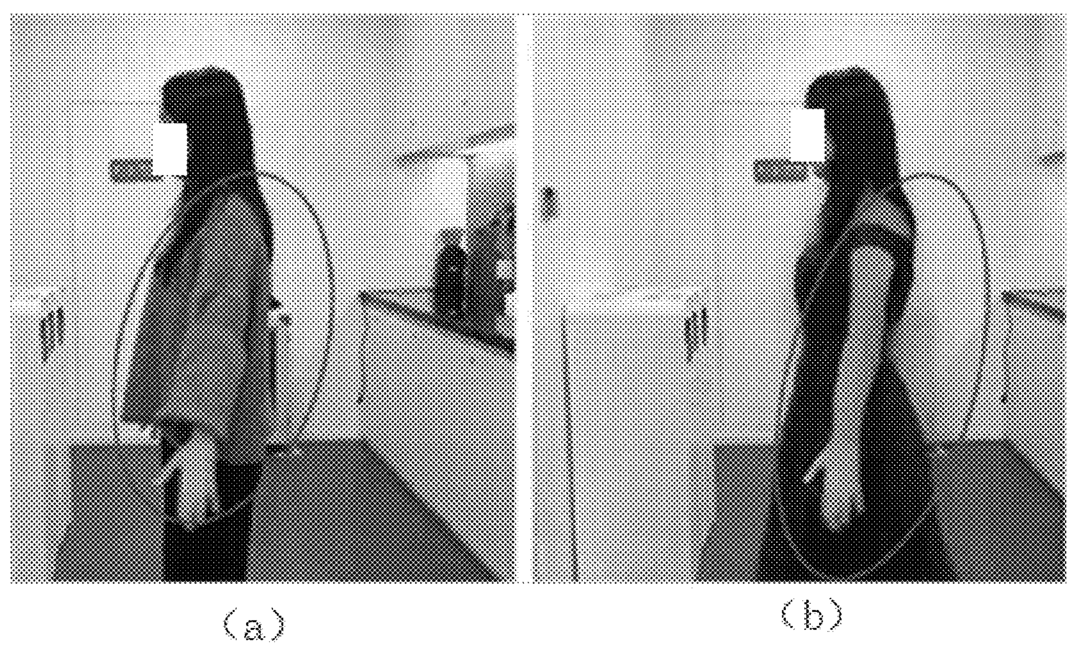
FIG. 5 is a schematic diagram of a rendering effect according to another embodiment of the disclosure.

Exemplarily, referring to FIG. 5, the original worn item in FIG. 5(*a*) is a fur coat including sleeves. The item to be worn is a skirt. Before the item to be worn is put on the target object, it may be determined that the item to be worn is of the first preset type, namely, the summer clothing type. After the item to be worn being the skirt is put on the user, the fur coat from the original worn item is mainly displayed on the arms, in this case, to improve the effect of cloud rendering for clothing try-on, the limb model corresponding to the arms may be invoked, and the clothing on the arms may be removed based on the limb model, thereby obtaining the finally rendered clothing try-on effect with the exposed arms, as shown in FIG. 5(*b*).

It should be further noted that the limb model may also be a full body model. That is, if the item to be worn is of the first preset type, based on the full body limb model, the entire original worn item put on the target object may be removed to obtain an unclothed object, and then, the item to be worn is put on the target object to obtain the target object satisfying the preset condition.

It should be further noted that if the body type of the user is significantly larger than the size of the item to be worn, in this case, the pixel points that should be covered but are not covered by the item to be worn may be erased, such that the technical effect that the item to be worn is adaptive to the target object is achieved.

According to the technical solution of this embodiment of the disclosure, the target object in the image to be processed is determined, and the three-dimensional body model corresponding to the target object is determined. Meanwhile, the to-be-worn effect corresponding to the item to be worn is determined, and then based on the material parameter of the item to be worn, the corresponding wearing effect, and the corresponding three-dimensional body model, the item to be worn is put on the target object and the target to-be-displayed object is obtained. If the display information of the target to-be-displayed object satisfies the preset condition, the target object in the image to be processed is updated based on the target to-be-displayed object, and the target object wearing the item to be worn is obtained. The technical solution of this embodiment of the disclosure avoids the situation that in the related art, the impact of various factors corresponding to the item to be worn on the rendering effect, or the impact of rendering computing power factors on the rendering effect in the rendering process is not considered, and as a result, there is a large deviation between the rendering effect and the actual effect, which in turn causes poor use experience to the user. Rendering can be performed in combination with the wearing effect and the material parameter of the item to be worn, thereby improving rendering authenticity and adaptability for the user.

Figure 6:
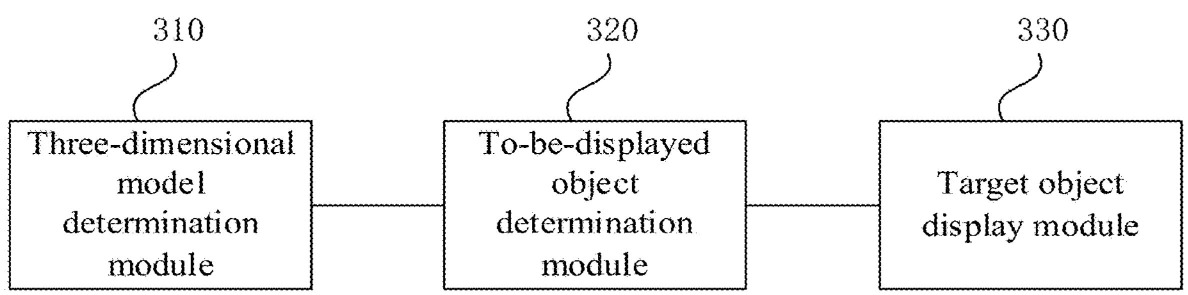
FIG. 6 is a structural schematic diagram of an image Processing means according to an embodiment of the disclosure.

FIG. 6 is a structural schematic diagram of an image processing apparatus according to an embodiment of the disclosure. As shown in FIG. 6, the apparatus includes: a three-dimensional model determination module 310, a to-be-displayed object determination module 320, and a target object display module 330.

The three-dimensional model determination module 310 is configured to determine a target object in image to be processed, and determine a three-dimensional body model corresponding to the target object. The to-be-displayed object determination module 320 is configured to determine a wearing effect to be processed corresponding to the item to be worn, and obtain a target to-be-displayed object wearing the item to be worn based on material information of the item to be worn, the wearing effect to be processed, and the three-dimensional body model. The target object display module 330 is configured to update the target object in the image to be processed based on the target to-be-displayed object in response to determining that display information of the target to-be-displayed object satisfies a preset condition.

Based on the above technical solution, the three-dimensional model determination module is further configured to receive at least one image to be processed sent by a client and a target video to which the at least one image to be processed belongs, thereby determining the wearing effect to be processed of the item to be worn based on the target video.

Based on the above technical solution, the three-dimensional model determination module is further configured to determine the target object based on label information in the image to be processed; or, take, as the target object, an object to be processed in the image to be processed with a display scale greater than a preset display scale; or, take all objects to be processed in the image to be processed as the target objects.

Based on the above technical solution, the three-dimensional model determination module is further configured to recognize a limb key point of the target object, and generate the three-dimensional body model based on the limb key point.

Based on the above technical solution, the to-be-displayed object determination module is further configured to determine the wearing effect to be processed of the item to be worn based on a target video to which the image to be processed belongs.

Based on the above technical solution, the to-be-displayed object determination module is further configured to determine at least two video frames in the target video that are associated with the image to be processed, and determine the wearing effect to be processed of the item to be worn based on the at least two video frames.

Based on the above technical solution, the apparatus further includes a material information determination module, configured to invoke the material information corresponding to the item to be worn from a store, where the store pre-stores the material information of the item to be worn; or, determine the material information corresponding to the item to be worn by processing an image corresponding to the item to be worn based on a pre-trained material parameter determination model.

Based on the above technical solution, the to-be-displayed object determination module is further configured to render the item to be worn consistent with the wearing effect to be processed on the three-dimensional body model with the material information as a rendering parameter, thereby obtaining the target to-be-displayed object wearing the item to be worn.

Based on the above technical solution, the target object display module is further configured to determine that the display information of the target to-be-displayed object satisfies the preset condition in response to determining that a pixel point corresponding to the item to be worn covers a pixel point of an original worn item of the target object; and update the target object in the image to be processed based on the target to-be-displayed object.

Based on the above technical solution, the target object display module is further configured to erase, in response to determining that the pixel point corresponding to the item to be worn do not cover the pixel point of the original worn item, an exposed pixel point of the original worn item, thereby obtaining the target to-be-displayed object satisfying the preset condition.

Based on the above technical solution, the apparatus further includes: a target object update module, including a limb model determination unit, configured to determine, in response to determining that an item type of the item to be worn is a first preset type, a limb model corresponding to the target object; and adjust, based on the limb model, a plurality of limb parts in the target to-be-displayed object, thereby updating the target object based on the adjusted limb parts.

According to the technical solution of this embodiment of the disclosure, the target object in the image to be processed is determined, and the three-dimensional body model corresponding to the target object is determined. Meanwhile, the to-be-worn effect corresponding to the item to be worn is determined, and then, based on the material parameter of the item to be worn, the corresponding wearing effect, and the corresponding three-dimensional body model, the item to be worn is put on the target body and the target to-be-displayed object is obtained. If the display information of the target to-be-displayed object satisfies the preset condition, the target object in the image to be processed is updated based on the target to-be-displayed object, and the target object wearing the item to be worn is obtained. The situation that in the related art, the impact of various factors corresponding to the item to be worn on the rendering effect, or the impact of rendering computing power factors on the rendering effect in the rendering process is not considered, and as a result, there is a large deviation between the rendering effect and the actual effect, which in turn causes poor use experience to the user is avoided. Rendering can be performed in combination with the wearing effect and the material parameter of the item to be worn, thereby improving rendering authenticity and adaptability for the user.

The image processing apparatus provided by this embodiment of the disclosure can execute the image processing method provided by any embodiment of the disclosure, and has the corresponding functional modules and beneficial effects for executing the method.

It should be noted that the various units and modules included in the apparatus are only divided according to functional logics, but are not limited to the above division, as long as the corresponding functions can be achieved; and in addition, the specific names of the functional units are only for the convenience of distinguishing each other, and are not intended to limit the scope of protection of this embodiment of the disclosure.

Figure 7:
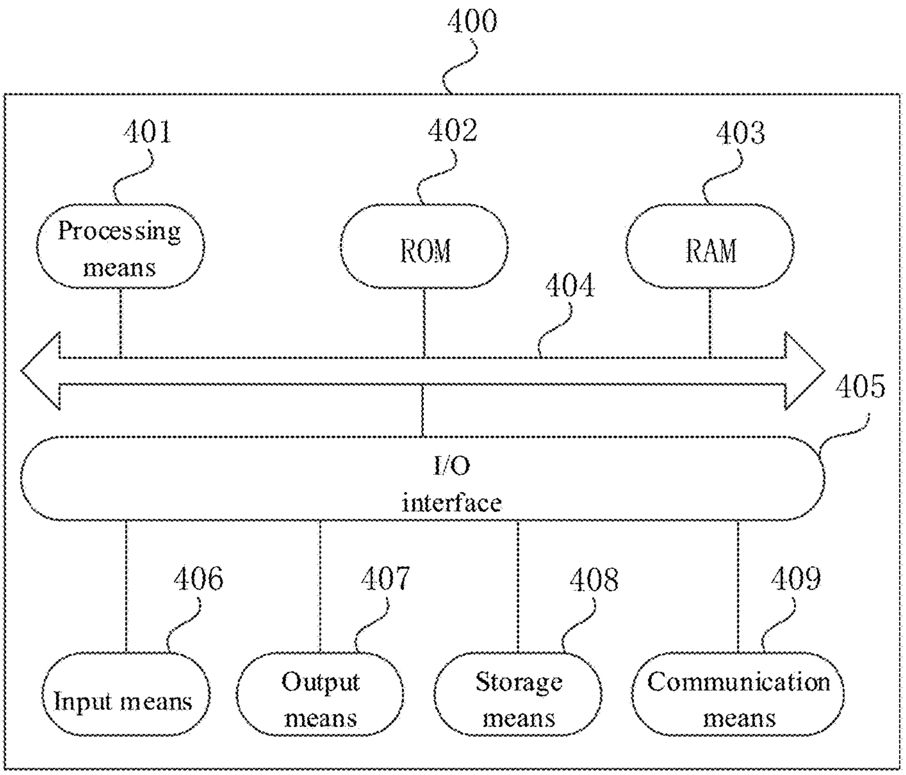
FIG. 7 is a structural schematic diagram of an electronic device according to an embodiment of the disclosure.

FIG. 7 is a structural schematic diagram of an electronic device according to an embodiment of the disclosure. Referring to FIG. 7 as below, FIG. 7 illustrates a structural schematic diagram of an electronic device (e.g., a terminal device or a server in FIG. 7) 400 applicable to implementing embodiments of the disclosure. The terminal device in this embodiment of the disclosure may include but not limited to mobile terminals such as a mobile phone, a notebook computer, a digital radio receiver, a personal digital assistant (PDA), a portable Android device (PAD), a portable media player (PMP), a vehicle-mounted terminal (e.g., a vehicle-mounted navigation terminal), and fixed terminals such as a digital TV and a desk computer. The electronic device shown in FIG. 7 is merely an example, which should not impose any limitations on functions and application ranges of this embodiment of the disclosure.

As shown in FIG. 7, the electronic device 400 may include a processing means (e.g., a central processing unit and a graphics processing unit) 401, which may perform various appropriate actions and processing according to programs stored on a read only memory (ROM) 402 or loaded from a storage means 406 into a random access memory (RAM) 403. The RAM 403 further stores various programs and data required for the operation of the electronic device 400. The processing means 401, the ROM 402, and the RAM 403 are connected to one another through a bus 404. An input/output (I/O) interface 405 is also connected to the bus 404.

Typically, the following means may be connected to the I/O interface 405: an input means 406, including, for example, a touchscreen, a touchpad, a keyboard, a mouse, a camera, a microphone, an accelerometer, and a gyroscope; an output means 407, including, for example, a liquid crystal display (LCD), a speaker, and a vibrator; the storage means 406, including, for example, a magnetic tape and a hard drive; and a communication means 409. The communication means 409 may allow the electronic device 400 to be in wireless or wired communication with other devices for data exchange. Although FIG. 7 illustrates the electronic device 400 with various means, it is to be understood that it is not necessary to implement or have all the shown means. Alternatively, more or fewer apparatuses may be implemented or provided.

According to this embodiment of the disclosure, the foregoing process described with reference to the flowchart may be implemented as a computer software program. For example, an embodiment of the disclosure includes a computer program product including a computer program stored on a non-transitory computer-readable medium. The computer program includes program code for executing the method shown in the flowchart. In this embodiment, the computer program may be downloaded and installed from the network by the communication means 409, or installed from the storage means 406, or installed from the ROM 402. The computer program, when executed by the processing means 401, performs the above functions limited in the method in this embodiment of the disclosure.

The names of messages or information exchanged between multiple means in the implementations of the disclosure are provided for illustrative purposes only, and are not intended to limit the scope of these messages or information.

The electronic device provided by this embodiment of the disclosure and the image processing method provided by the foregoing embodiment belong to the same inventive concept, and for technical details not described in detail in this embodiment, reference may be made to the foregoing embodiment. This embodiment and the foregoing embodiment have the same beneficial effects.

An embodiment of the disclosure provides a computer storage medium, storing a computer program. The program, when executed by a processor, implements the image processing method provided by the foregoing embodiment.

It should be noted that the computer-readable medium in the disclosure may be a computer-readable signal medium, or a computer-readable storage medium, or any combination thereof. For example, the computer-readable storage medium may include but not limited to: electrical, magnetic, optical, electromagnetic, infrared, or semiconductor systems, apparatuses, or devices, or any combination thereof. More specific examples of the computer-readable storage medium may include but not limited to: an electrical connection with one or more wires, a portable computer disk, a hard drive, a random access memory (RAM), a read only memory (ROM), an erasable programmable read only memory (EPROM or a flash memory), fiber optics, a portable compact disc read only memory (CD-ROM), an optical storage device, a magnetic storage device, or any proper combination of the above. In the disclosure, the computer-readable storage medium may be any tangible medium including or storing a program, and the program may be used by an instruction execution system, apparatus, or device, or used in conjunction with the instruction execution system, apparatus, or device. However, in the disclosure, the computer-readable signal medium may include data signals propagated in a baseband or propagated as a part of a carrier wave, which carry computer-readable program code. The propagated data signals may have a plurality of forms, including but not limited to electromagnetic signals, optical signals, or any proper combination of the above. The computer-readable signal medium may be any computer-readable medium other than the computer-readable storage medium. The computer-readable signal medium may send, propagate, or transmit the program used by the instruction execution system, apparatus, or device, or used in conjunction with the instruction execution system, apparatus, or device. The program code included in the computer-readable medium may be transmitted by any proper medium including but not limited to a wire, an optical cable, radio frequency (RF), etc., or any proper combination of the above.

In some implementations, the client and the server can communicate using any currently known or future-developed network protocols such as a hypertext transfer protocol (HTTP), and may also be in communication connection with digital data in any form or medium (e.g., a communication network). For example, the communication network includes a local area network ("LAN"), a wide area network ("WAN"), Internet work (e.g., Internet), a peer-to-peer network (e.g., an ad hoc peer-to-peer network), and any currently known or future-developed networks.

The computer-readable medium may be included in the electronic device; and may separately exist without being assembled in the electronic device.

The computer-readable medium carries one or more programs. The one or more programs, when executed by the electronic device, enable the electronic device to: determine a target object in an image to be processed, and determine a three-dimensional body model corresponding to the target object; determine a wearing effect to be processed corresponding to an item to be worn, and obtain a target to-be-displayed object wearing the item to be worn based on material information of the item to be worn, the wearing effect to be processed, and the three-dimensional body model; and update, in response to determining that display information of the target to-be-displayed object satisfies a preset condition, the target object in the image to be processed based on the target to-be-displayed object.

The computer program code for executing the operations of the disclosure may be written in one or more programming languages or a combination thereof. The programming languages include but not limited to object-oriented programming languages such as Java, Smalltalk, C++, as well as conventional procedural programming languages such as "C" or similar programming languages. The program code may be executed entirely or partially on a user computer, executed as a standalone software package, executed partially on the user computer and partially on a remote computer, or entirely executed on the remote computer or server. In the case of involving the remote computer, the remote computer may be connected to the user computer via any type of network, including a local area network (LAN) or wide area network (WAN), or may be connected to an external computer (e.g., utilizing an Internet service provider for Internet connectivity).

The flowcharts and block diagrams in the accompanying drawings illustrate system architectures, functions, and operations possibly implemented by the system, method and computer program product according to the various embodiments of the disclosure. In this regard, each block in the flowcharts or block diagrams may represent a module, a program segment, or a portion of code, and the module, program segment, or portion of code includes one or more executable instructions for implementing specified logical functions. It should be noted that in some alternative implementations, functions marked in the blocks may also occur in an order different from that marked in the accompanying drawings. For example, two consecutively-shown blocks may actually be executed basically in parallel, but sometimes may also be executed in a reverse order, which depends on involved functions. It should be further noted that each block in the block diagrams and/or flowcharts as well as a combination of the blocks in the block diagrams and/or flowcharts may be implemented by using a dedicated hardware-based system that executes specified functions or operations, or using a combination of special hardware and computer instructions.

The units described in the embodiments of the disclosure may be implemented through software or hardware. The name of the unit does not limit the unit in a certain case. For example, a first acquisition unit may also be described as "a unit for acquiring at least two Internet protocol addresses".

The functions described above in this specification may be at least partially executed by one or more hardware logic components. For example, exemplary hardware logic components that can be used include but not limited to a field-programmable gate array (FPGA), an application specific integrated circuit (ASIC), an application specific standard part (ASSP), a system on chip (SOC), a complex programmable logic device (CPLD), etc.

In the context of the disclosure, a machine-readable medium may be a tangible medium that may contain or store a program, and the program may be used by an instruction execution system, apparatus, or device, or used in conjunction with the instruction execution system, apparatus, or device. The machine-readable medium may be a machine-readable signal medium or a machine-readable storage medium. The machine-readable medium may include but not limited to: electronic, magnetic, optical, electromagnetic, infrared, or semiconductor systems, apparatuses, or devices, or any proper combination of the above. More specific examples of the machine-readable storage medium may include: an electrical connection based on one or more wires, a portable computer disk, a hard drive, a random access memory (RAM), a read only memory (ROM), an erasable programmable read only memory (EPROM or a flash memory), fiber optics, a portable compact disc read only memory (CD-ROM), an optical storage device, a magnetic storage device, or any proper combination of the above.

According to one or more embodiments of the disclosure, Example 1 provides an image processing method, including:

- determining a target object in an image to be processed, and determining a three-dimensional body model corresponding to the target object;
- determining a wearing effect to be processed corresponding to an item to be worn, and obtaining a target to-be-displayed object wearing the item to be worn based on material information of the item to be worn, the wearing effect to be processed, and the three-dimensional body model; and
- updating, in response to determining that display information of the target to-be-displayed object satisfies a preset condition, the target object in the image to be processed based on the target to-be-displayed object.

According to one or more embodiments of the disclosure, Example 2 provides an image processing method. The method further includes:

- for example, before determining the target object in the image to be processed,
- receiving at least one image to be processed sent by a client and a target video to which the at least one image to be processed belongs, thereby determining the wearing effect to be processed of the item to be worn based on the target video.

According to one or more embodiments of the disclosure, Example 3 provides an image processing method. The method further includes:

- for example, determining the target object in the image to be processed includes one of the following:
- determining the target object based on label information in the image to be processed;
- taking, as the target object, an object to be processed in the image to be processed with a display scale greater than a preset display scale; or
- taking all objects to be processed in the image to be processed as the target objects.

According to one or more embodiments of the disclosure, Example 4 provides an image processing method. The method further includes:

- for example, determining the three-dimensional body model corresponding to the target object includes:
- recognizing a limb key point of the target object; and
- generating the three-dimensional body model based on the limb key point.

According to one or more embodiments of the disclosure, Example 5 provides an image processing method. The method further includes:

for example, determining the wearing effect to be processed of the item to be worn includes:

determining the wearing effect to be processed of the item to be worn based on a target video to which the image to be processed belongs.

According to one or more embodiments of the disclosure, Example 6 provides an image processing method. The method further includes:

for example, determining the wearing effect to be processed of the item to be worn based on the target video to which the image to be processed belongs includes:

determining at least two video frames in the target video that are associated with the image to be processed; and determining the wearing effect to be processed of the item to be worn based on the at least two video frames.

According to one or more embodiments of the disclosure, Example 7 provides an image processing method. The method further includes:

for example, invoking the material information corresponding to the item to be worn from a store, wherein the store pre-stores the material information of the item to be worn; or determining the material information corresponding to the item to be worn by processing an image corresponding to the item to be worn based on a pre-trained material parameter determination model.

According to one or more embodiments of the disclosure, Example 8 provides an image processing method. The method further includes:

for example, obtaining the target to-be-displayed object wearing the item to be worn based on the material information of the item to be worn, the wearing effect to be processed, and the three-dimensional body model includes:

rendering the item to be worn consistent with the wearing effect to be processed on three-dimensional body model with the material information as a rendering parameter, thereby obtaining the target to-be-displayed object wearing the item to be worn.

According to one or more embodiments of the disclosure, Example 9 provides an image processing method. The method further includes:

for example, updating, in response to determining that the display information of the target to-be-displayed object satisfies the preset condition, the target object in the image to be processed based on the target to-be-displayed object includes:

determining that the display information of the target to-be-displayed object satisfies the preset condition in response to determining that a pixel point corresponding to the item to be worn covers a pixel point of an original worn item of the target object; and updating the target object in the image to be processed based on the target to-be-displayed object.

According to one or more embodiments of the disclosure, Example 10 provides an image processing method. The method further includes:

for example, erasing, in response to determining that the pixel point corresponding to the item to be worn do not cover the pixel point of the original worn item, an exposed pixel point of the original worn item, thereby obtaining the target to-be-displayed object satisfying the preset condition.

According to one or more embodiments of the disclosure, Example 11 provides an image processing method. The method further includes:

for example, determining, in response to determining that an item type of the item to be worn is a first preset type, a limb model corresponding to the target object; and adjusting, based on the limb model, a plurality of limb parts in the target to-be-displayed object, thereby updating the target object based on the adjusted limb parts.

According to one or more embodiments of the disclosure, Example 12 provides an image processing apparatus. The apparatus includes:

a three-dimensional model determination module, configured to determine a target object in an image to be processed, and determine a three-dimensional body model corresponding to the target object;

a to-be-displayed object determination module, configured to determine a wearing effect to be processed corresponding to an item to be worn, and obtain a target to-be-displayed object wearing the item to be worn based on material information of the item to be worn, the wearing effect to be processed, and the three-dimensional body model; and a target object display module, configured to update, in response to determining that display information of the target to-be-displayed object satisfies a preset condition, the target object in the image to be processed based on the target to-be-displayed object.

Further, although the operations are described in a particular order, it should not be understood as requiring these operations to be performed in the shown particular order or in a sequential order. In certain environments, multitasking and parallel processing may be advantageous. Similarly, although several specific implementation details are included in the above discussion, these specific implementation details should not be interpreted as limitations on the scope of the disclosure. Certain features described in the context of separate embodiments may also be implemented in combination in a single embodiment. Conversely, various features described in the context of a single embodiment may also be implemented separately or in any suitable sub-combination in a plurality of embodiments.

I claim:

1. An image processing method, comprising:

determining a target object in an image, and determining a three-dimensional body model corresponding to the target object;

determining a virtual tryon effect corresponding to an item to be tried on;

obtaining a candidate object trying on the item according to material information of the item, the virtual tryon effect, and the three-dimensional body model, wherein the virtual tryon effect is a dynamic effect related to the item being applied to the target object in the image, and the dynamic effect comprises a fluttering effect with a fluttering height and a fluttering angle determined by a previous frame; and updating, in response to determining that display information of the candidate object satisfies a preset condition, the target object in the image based on the candidate object.

2. The image processing method according to claim 1, further comprising: before determining the target object in the image, receiving at least one image sent by a client and a target video to which the at least one image belongs, thereby determining the virtual tryon effect of the item based on the target video.

3. The image processing method according to claim 1, wherein determining the target object in the image comprises one of the following:

determining the target object according to label information in the image;

taking, as the target object, an object to be processed in the image with a display scale greater than a preset display scale; or taking all objects to be processed in the image as target objects.

4. The image processing method according to claim 1, wherein determining the three-dimensional body model corresponding to the target object comprises:

recognizing a limb key point of the target object; and generating the three-dimensional body model based on the limb key point.

5. The image processing method according to claim 1, wherein determining the virtual tryon effect of the item comprises:

determining the virtual tryon effect of the item based on a target video to which the image belongs.

6. The image processing method according to claim 5, wherein determining the virtual tryon effect of the item based on the target video to which the image belongs comprises:

determining at least two video frames in the target video that are associated with the image; and determining the virtual tryon effect of the item based on the at least two video frames.

7. The image processing method according to claim 1, further comprising:

invoking the material information corresponding to the item from a store, wherein the store pre-stores the material information of the item; or determining the material information corresponding to the item by processing a second image corresponding to the item based on a pre-trained material parameter determination model.

8. The image processing method according to claim 1, wherein obtaining the candidate object trying on the item according to the material information of the item, the virtual tryon effect, and the three-dimensional body model comprises:

rendering the item consistent with the virtual tryon effect on the three-dimensional body model with the material information as a rendering parameter, thereby obtaining the candidate object trying on the item.

9. The image processing method according to claim 8, wherein updating, in response to determining that the display information of the candidate object satisfies the preset condition, the target object in the image based on the candidate object comprises:

determining that the display information of the candidate object satisfies the preset condition in response to determining that a pixel point corresponding to the item covers a pixel point of an original worn item of the target object; and updating the target object in the image based on the candidate object.

10. The image processing method according to claim 9, further comprising:

erasing, in response to determining that the pixel point corresponding to the item to be tried on do not cover the pixel point of the original worn item, an exposed pixel point of the original worn item, thereby obtaining the candidate object satisfying the preset condition.

11. The image processing method according to claim 1, further comprising:

determining, in response to determining that an item type of the item is a first preset type, a limb model corresponding to the target object; and adjusting, based on the limb model, a plurality of limb parts in the candidate object, thereby updating the target object based on the adjusted plurality of limb parts.

12. An electronic device, comprising:

one or more processors; and a storage means, configured to store one or more programs, wherein when the one or more programs are executed by the one or more processors, the one or more processors are caused to:

determine a target object in an image, and determining a three-dimensional body model corresponding to the target object;

determine a virtual tryon effect corresponding to an item to be tried on, and obtaining a candidate object trying on the item according to material information of the item, the virtual tryon effect, and the three-dimensional body model, wherein the virtual tryon effect is a dynamic effect related to the item being applied to the target object in the image, and the dynamic effect comprises a fluttering effect with a fluttering height and a fluttering angle determined by a previous frame; and update, in response to determining that display information of the candidate object satisfies a preset condition, the target object in the image based on the candidate object.

13. The electronic device according to claim 12, wherein the one or more processors are caused to: before determining the target object in the image, receive at least one image sent by a client and a target video to which the at least one image belongs, thereby determining the virtual tryon effect of the item based on the target video.

14. The electronic device according to claim 12, wherein the one or more processors being caused to determine the target object in the image comprises being caused to perform one of the following:

determining the target object according to label information in the image;

taking, as the target object, an object to be processed in the image with a display scale greater than a preset display scale; or taking all objects to be processed in the image as target objects.

15. The electronic device according to claim 12, wherein the one or more processors are caused to determine the three-dimensional body model corresponding to the target object comprises being caused to:

recognize a limb key point of the target object; and generate the three-dimensional body model based on the limb key point.

16. The electronic device according to claim 12, wherein the one or more processors are caused to determine the virtual tryon effect of the item comprises being caused to:

determine the virtual tryon effect of the item based on a target video to which the image belongs.

17. The electronic device according to claim 16, wherein the one or more processors are caused to determine the virtual tryon effect of the item based on the target video to which the image belongs comprises being caused to:

determine at least two video frames in the target video that are associated with the image; and determine the virtual tryon effect of the item based on the at least two video frames.

18. The electronic device according to claim 12, wherein the one or more processors are further caused to:

invoke the material information corresponding to the item from a store, wherein the store pre-stores the material information of the item; or determine the material information corresponding to the item by processing a second image corresponding to the item based on a pre-trained material parameter determination model.

19. The electronic device according to claim 12, wherein the one or more processors are caused to obtain the candidate object trying on the item according to the material information of the item, the virtual tryon effect, and the three-dimensional body model comprises being caused to:

render the item consistent with the virtual tryon effect on the three-dimensional body model with the material information as a rendering parameter, thereby obtaining the candidate object trying on the item.

20. A non-transitory storage medium comprising computer executable instructions, wherein the computer executable instructions, when executed by a computer processor, implement:

determining a target object in an image, and determining a three-dimensional body model corresponding to the target object;

determining a virtual tryon effect corresponding to an item to be tried on, and obtaining a candidate object trying on the item according to material information of the item, the virtual tryon effect, and the three-dimensional body model, wherein the virtual tryon effect is a dynamic effect related to the item being applied to the target object in the image, and the dynamic effect comprises a fluttering effect with a fluttering height and a fluttering angle determined by a previous frame; and updating, in response to determining that display information of the candidate object satisfies a preset condition, the target object in the image based on the candidate object.

* * * * *